3,706,026
APPARATUS FOR DETERMINING RESONANT
FREQUENCIES OF A SPECIMEN OF MAG-
NETOSTRICTIVE MATERIAL
Thomas E. Johnson, Jr., Plum Borough, and Peter R.
Mould, Franklin Township, Westmoreland County,
Pa., assignors to United States Steel Corporation
Filed Nov. 16, 1970, Ser. No. 89,685
Int. Cl. G01r 33/18
U.S. Cl. 324—34 MA                3 Claims

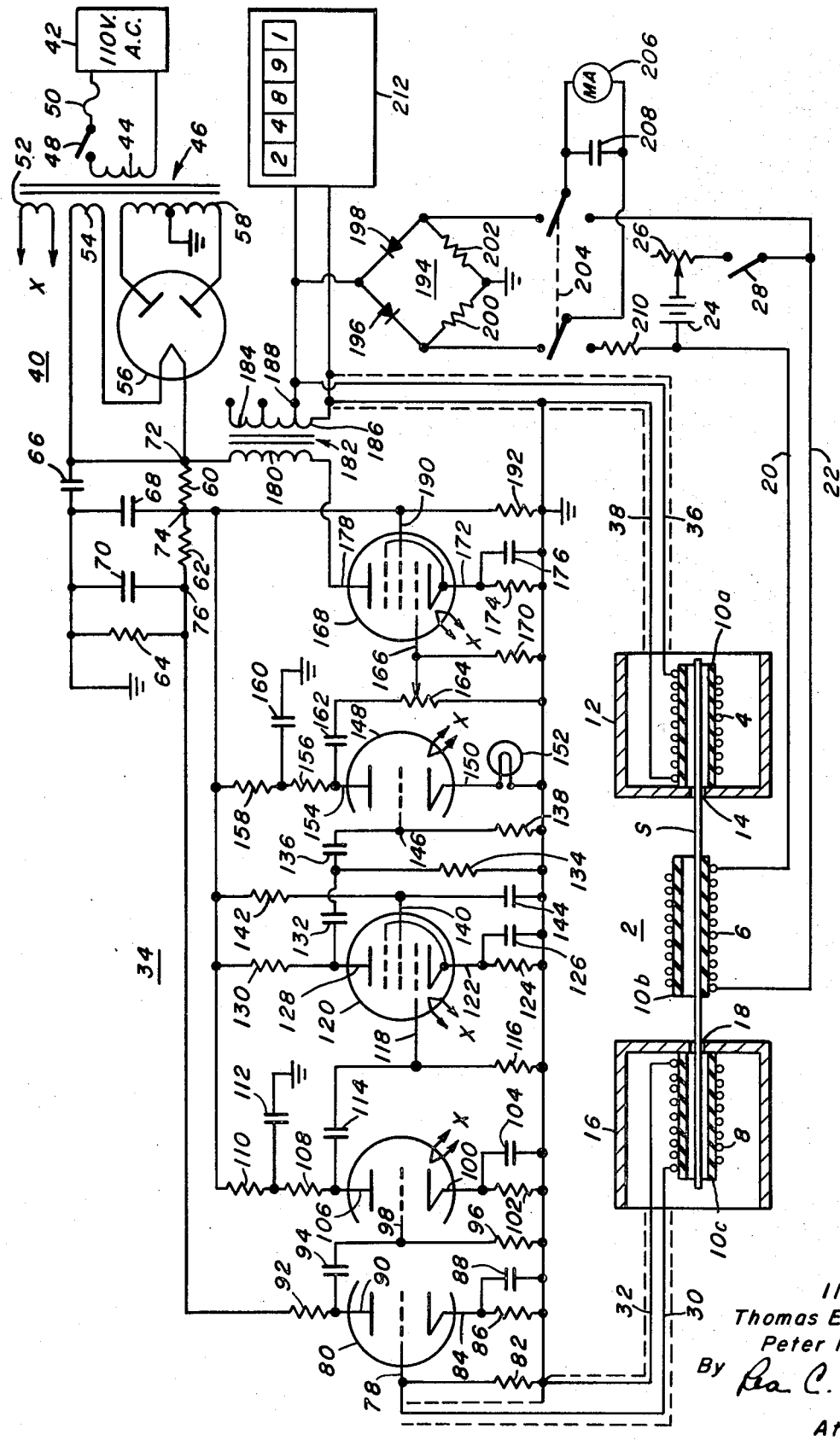

ABSTRACT OF THE DISCLOSURE

An apparatus for the accurate determination of the resonant frequency of a carbon sheet steel specimen has a measuring head of three axially aligned encircling coils surrounding the specimen. The specimen midpoint resting on the center biasing encircling coil provides the sole support of the specimen. A shielded pickup coil surrounding one end of the specimen is connected to the input of a high gain amplifier, and the amplifier output is connected in a feedback arrangement to a shielded drive coil surrounding the other end of the sample. Frequency filtering and phase shifting in the amplifier assures oscillation by magnetostrictive induction between the drive coil and the pickup coil at the fundamental, longitudinal resonant frequency of the specimen. The frequency is measured by an electronic counter.

---

This invention relates to apparatus for determining a resonant frequency of a carbon steel test specimen and more particularly, to an apparatus which causes the specimen to vibrate at its resonant frequency by magnetostriction.

The ability to predict the drawability and of carbon steel sheet and the tendency of such sheets to develop ears or scallops during forming greatly facilitates the proper selection of carbon steel sheets for their intended end use. It is well known that such prediction may be made by determining the plastic-strain ratio of the sheet. This method requires carefully performed tension tests on carefully prepared specimens to disclose the small differences in plastic-flow characteristics that relate to differences in drawability and earing tendencies and therefore is not suitable as a mill-quality control test.

Recent studies (see an article entitled "The Use of Young's Modulus for Predicting the Plastic-Strain Ratio of Low-Carbon Steel Sheets" by C. A. Stickels and P. R. Mould in Metallurgical Transactions, vol. I, May 1970, pages 1303–1312) have shown an excellent correlation between the average Young's modulus of elasticity and the average plastic-strain ratio as well as the planar anisotropy of Young's modulus and the planar anisotropy of the plastic-strain ratio. Even though differences in modulus are small, and modulus values must be obtained with great accuracy, determining drawability from Young's modulus provides a more suitable mill-quality control test than measuring plastic-strain ratio. The fact that Young's modulus may be determined in a matter of minutes by the resonant frequency technique makes this technique an attractive potential for mill-quality control determination of drawability and earing tendencies.

Since most accurate determinations of Young's modulus have been involved in scientific investigations of the properties of solids, resonant frequency equipment is usually an assembly of multi-purpose scientific laboratory apparatus. Such equipment usually causes a specimen to vibrate mechanically in synchronization with a variable frequency driving source. The frequency is then varied until the amplitude of specimen vibration is a maximum, as indicated, for example, by an oscilloscope display of the output of a displacement transducer coupled to the specimen, and then the frequency at which the maximum amplitude vibration occurs, the resonant frequency, is determined by an accurate counter. Both mechanical and electrical coupling have been used to connect the driving source and the displacement gauge to the specimen. This equipment is delicate, expensive and even commercially available resonant frequency equipment requires considerable operator skill in placing the specimen and selecting the amplitude maximum. In most magnetostrictive oscillators, primarily in the field of ultrasonics and communications, nickel or ferrite rods having large magnetostrictions are used in transducers, filters or stabilizing elements in low frequency transmitters or receivers. In such applications a single magnetostrictive element is usually clamped in place and mechanical or electrical adjustments are made to bring the resonant frequency into correspondence with a particular desired frequency.

It is therefore an object of our invention to provide an apparatus to determine the fundamental, longitudinal resonant frequency of a carbon steel specimen that is highly accurate and is simple to operate.

Another object is to provide such apparatus that is inexpensive and is insensitive to external vibration.

A still further object is to provide such apparatus that is free from operator subjectivity and requires little care in specimen placement for successful operation.

These and other objects will become more apparent after referring to the following drawing and specification in which the single figure is a schematic drawing of the apparatus of our invention.

Referring now to the drawing, reference letter S represents a sample of low-carbon sheet steel for which the fundamental, longitudinal, mechanical resonant frequency is to be determined. Sample S is shown in place in a measuring head coil assembly, generally shown as reference numeral 2. Assembly 2 has an encircling drive coil 4, an encircling bias-field coil 6 and an encircling pickup coil 8. Coils 4, 6 and 8 are shown in section. As shown, coils 4, 6 and 8 are 200 turns of 30 gauge copper magnet wire wound on insulating frames 10a, 10b and 10c shown in section, which are each ¾ inch long with inside dimensions 0.1 inch by 0.375 inch. The coils are aligned so that when the sample S is placed inside the coils, the middle of the sample rests on the insulating frame of coil 6, the ends of the sample extend to the outer ends of coils 4 and 8, and the sample does not contact the insulating frames of coils 4 and 8. A ferromagnetic shielding cup 12, shown in section, is a one-inch-diameter flat-bottomed deep-drawn cup of twenty gauge low-carbon sheet steel surrounding drive coil 4 and has an opening 14 through which sample S passes. A similar shielding cup 16 surrounds coil 8 and has an opening 18 for sample S. Openings 14 and 18 are of a size and shape just slightly larger than sample S so that sample S does not contact cups 12 and 16 when resting on the insulating frame of coil 6. Coil 6 is connected by lines 20 and 22 to a 1½ volt battery 24, a 100 ohm variable resistor 26 and a switch 28. Pickup coil 8 is connected by a line 30 and a line 32 to the input of a five-stage amplifier generally shown at 34. Drive coil 4 is connected by a line 36 and a line 38 to the output of amplifier 34. The connecting lines are shielded with lines 32 and 38 as grounded shielding.

A power supply, generally shown at 40, for amplifier 34 has a power source 42, of 110 volts AC connected to a primary winding 44 of a power transformer 46 through a switch 48 and fuse 50. Transformer 46 may be a Thordarson Model 22RO4 power transformer. Transformer 46 has a first secondary winding 52 for amplifier tube filaments with connections shown at reference letter X. A second secondary winding 54 is connected for heating the filament of a type 5Y3 rectifier tube 56. A third secondary winding 58 having a grounded center tap is connected to the plates of tube 56. Three resistors 60, 62 and 64 and three capacitors 66, 68 and 70 are connected in a conventional RC filtered DC power supply arrangement to provide a first direct current power supply at terminal 72, a second direct current power supply at terminal 74 and a third direct current power supply at terminal 76.

Connecting line 30 connects to a first grid terminal 78 of a duo-triode tube 80 as shown a type 7025 and to ground through a resistor 82. A first cathode terminal 84 of tube 80 is connected to ground through a resistor 86 and a capacitor 88. A first plate terminal 90 of tube 80 is connected to terminal 76 through a resistor 92 and to ground through a capacitor 94 in series with a resistor 96. The connection between capacitor 94 and resistor 96 is connected to a second grid terminal 98 of tube 80. A second cathode terminal 100 is connected to ground through a resistor 102 and a capacitor 104. A second plate terminal 106 of tube 80 is connected to terminal 74 through a resistor 108 and a resistor 110 connected in series. A capacitor 112 is connected between ground and the connection between resistors 108 and 110. Capacitor 112 and resistor 110 provide interstage decoupling. Plate terminal 106 is also connected to ground through a capacitor 114 and a resistor 116 connected in series. The connection between capacitor 114 and resistor 116 is connected to a grid terminal 118 of a high gain pentode tube 120, as shown type 6CB6. Capacitor 114 and resistor 116 comprise a first phase shifting network. Tube 120 has a cathode terminal 122 connected to ground through a resistor 124 and a capacitor 126. Tube 120 has a plate terminal 128 connected to termial 74 through a resistor 130. Plate terminal 128 is also connected to a capacitor 132 and capacitor 132 is connected to ground through a resistor 134 and also to ground through a capacitor 136 in series with a resistor 138. Capacitors 132 and 136 and resistors 134 and 138 comprise a second phase shifting network. A screen grid terminal 140 of tube 120 is connected to terminal 74 through a resistor 142 and to ground through a capacitor 144. The connection between capacitor 136 and resistor 138 is connected to a grid terminal 146 of a triode 148, as shown a type 7025. Tube 148 has a cathode terminal 150 connected to ground through a four watt 120 volt lamp 152. Tube 148 has a plate terminal 154 connected to terminal 74 through a resistor 156 and a resistor 158 connected in series. A capacitor 160 is connected between ground and the connection between resistors 156 and 158. Capacitor 160 and resistor 158 provide interstage decoupling. Plate terminal 154 is also connected to ground through a capacitor 162 and a one megohm potentiometer 164. The slider of potentiometer 164 is connected to a terminal grid 166 of a tube 168, as shown a pentode type 6L6, and to ground through a resistor 170. Capacitor 162, potentiometer 164 and resistor 170 comprise a third phase shifting network. Tube 168 has a cathode terminal 172 connected to ground through a resistor 174 and a capacitor 176. Tube 168 has a plate terminal 178 connected to terminal 72 through a primary winding 180 of an output transformer 182, as shown, a Triad S-27A. Transformer 182 has a secondary winding 184 with a common terminal 186 connected to line 38, a 4 ohm output terminal 188 connected to line 36, an 8 ohm output terminal and a 16 ohm output terminal. Tube 168 also has a screen grid terminal 190 connected to terminal 74 and to ground through a resistor 192.

A conventional bridge circuit 194 has a 1 ma. silicon diode 196 and a 1 ma. silicon diode 198 connected to output terminal 188 and a resistor 200 and a resistor 202 connected to diodes 196 and 198 and to ground. A double-throw switch 204 connects a 500 ma. 100 ohm ammeter 206, paralleled by a capacitor 208 to bridge circuit 194 or to bias coil 6 through a resistor 210. Terminals 186 and 188 are also connected to an electronic counter 212, as shown a Model No. 5321B manufactured by Hewlett-Packard Company, Palo Alto, Calif.

The values of resistors and capacitors are as follows:

| | | |
|---|---|---:|
| 174 | ohms | 500 |
| 124 | do | 1040 |
| 210 | do | 1250 |
| 86, 102 | do | 2700 |
| 60, 200, 202 | do | 10K |
| 110, 158 | do | 15K |
| 156 | do | 19K |
| 62, 64 | do | 33K |
| 82 | do | 47K |
| 92, 108 | do | 82K |
| 130, 134, 170, 192 | do | 270K |
| 96 | do | 330K |
| 116, 138, 142 | do | 680K |
| 114, 132, 136 | pfd | 15 |
| 162 | pfd | 100 |
| 94 | μfd | 0.01 |
| 144 | μfd | 0.1 |
| 208 | μfd | 8.8 |
| 70, 126 | μfd | 10 |
| 68 | μfd | 15 |
| 112, 160 | μfd | 16 |
| 88, 104 | μfd | 25 |
| 66 | μfd | 40 |
| 176 | μfd | 100 |

A specimen is prepared from the sheet to be tested, preferably by a conventional punch and die set. A specimen width of up to about ¼ inch will fit inside the insulating frames, and the frames are dimensioned and located to readily accept sheet thicknesses up to about 0.070 inch. While the width and length may vary so long as the specimen properly fits inside the insulating frames, the length should be as close as conveniently possible to 4.1193 inches as hereinafter explained.

Young's modulus of elasticity may be determined from the formula $$E = 4pL^2f^2 \qquad (1)$$

where $E=$Young's modulus of elasticity,
$p=$Mass density of the specimen,
$L=$Length of the specimen, and
$f=$Resonant frequency for an extensional wave passed along the length of the specimen.

This equation may be reduced to $$E = \frac{f^2}{20} \qquad (2)$$

where $E=$Young's modulus of elasticity in p.s.i., and
$f=$The resonant frequency in Hz. for an extensional wave passed along the length of the specimen, provided the specimen is 4.1193 inches long and has a density of 0.2844 lb. per cubic inch, the typical density of low-carbon sheet steel. The standard sample length of 4.1193 inches is selected to simplify the calculation of Young's modulus when the frequency has been determined. At this length the fundamental resonant frequency will be about 25,000 Hz.

The specimen is then placed in measuring head 2. Coils 4 and 8 are about two inches apart. A suitable end stop may be placed at the end of one coil as a back stop so that the specimen S projects slightly from the outer end of the other coil to facilitate insertion and withdrawal. The specimen must not touch the end stop. The specimen S rests on the insulating frame of coil 6, centered between coils 4 and 8, does not touch the insulating frames of coils 4 and 8 or the walls of cups 12 and 16.

Switch 28 is closed and switch 204 closed in its lower position. Variable resistor 26 is adjusted to provide the desired bias-field current in coil 6. A current of about 400 ma. usually provides sufficient magnetic bias to prevent magnetic field reversal and frequency doubling. Coil 6 must magnetically polarize specimen S to a field strength higher than the peak amplitude of the alternating field that results during the subsequent operation of the system. The bias need not be reset for each specimen but may be set for a series of tests.

Switch 48 is closed to energize the amplifier and switch 204 is placed in its upper position so that meter 206 may measure the RMS output of amplifier 34. Potentiometer 164, initially set for a minimum output of amplifier 34, is then adjusted to increase the output of amplifier 34 until the system goes into oscillation, indicated by a large increase in the reading of meter 206. The output of amplifier 34 must be large enough to overcome damping losses. Potentiometer 164 is then adjusted again to reduce the current indicated on meter 206 to about 250 microamperes. Counter 212 will then indicate the fundamental resonant frequency of the specimen. Counter 212 may be set to automatically make consecutive one second totals and will provide a stable total by the third total.

There is apparently sufficient shot noise in the vacuum tubes so that by increasing the gain with potentiometer 164, an output of sufficient magnitude is provided to coil 4 to begin oscillation. When an alternating current flows through coil 4, an alternating field is developed in the interior of coil 4. Specimen S, in the presence of this alternating field, biased by coil 6, alternately contracts and extends longitudinally due to magnetostriction. These vibrations traverse the specimen with the velocity of sound and appear as alternate compressive and tensile strains in the portion of the specimen that is in pickup coil 8. These changes in strain change the permeability of the specimen and thus the magnetic flux density in the specimen which in turn induce an alternating current in pickup coil 8. By feeding the signal picked up by coil 8 back into coil 4 in the proper phase relationship with the mechanical vibrations, the specimen then becomes the controlling element of a magnetostrictive resonant frequency oscillator.

Because coils 4 and 8 with specimen S as a core constitute a transformer, there is also transformer coupling between coils 4 and 8. The output of coil 8 is therefore the complex sum of the signal induced by magnetostriction of the specimen and a transformer-coupled signal. Because the amplitude of the transformer-coupled signal is dependent on specimen size and permeability and therefore will vary from specimen to specimen and because electrical oscillations that have little relation to the mechanical resonant frequencies of the specimen can occur when a transformer-coupled signal is large, pickup coil 8 must be electromagnetically isolated from drive coil 4 to minimize transformer coupling. Shielding cups 12 and 16, with sides extending beyond the ends of the coils they shield, and with the inner axial openings 14 and 18 closely approximating the size of the specimen, tend to increase the isolation between coils 4 and 8. It is not necessary that the sides of the cups extend outwardly beyond the ends of the specimen as shown in the drawing. In addition, with the specimen and coil dimensions as already discussed, if the spacing between coils 4 and 8 is at least two inches, the pickup signal in coil 8 at mechanical resonance of the specimen is about ten times the transformer-coupled signal which is sufficient isolation to insure that the system oscillates at the mechanical resonant frequency of the specimen S. While shielding in the form of low-carbon sheet steel cups surrounding both coils is preferred, any ferromagnetic material such as nickel-iron-cobalt alloys and any shape, such as a disc or plate, may be used with either or both coils so long as the transformer-coupled signal does not become too large.

The signal from coil 8 is connected to the input of the five stage RC coupled high gain amplifier 34. There must be sufficient amplification to offset electrical and mechanical losses of the system. The signal is amplified through the five stages and the three-phase-shifting networks. These networks assure that the input signal to drive coil 4 produces a mechanical contraction and extension of the specimen that is in proper phase relation with the vibration that has been reflected at the specimen ends so that the system will oscillate at the frequency that is the mechanical resonant frequency of the specimen. The phase-shifting networks also act as a filter by strongly attenuating low frequencies, thus preventing 60 cycle pickup and low frequency oscillations below the fundamental frequency of the sample. The lines between coils 4 and 8 and amplifier 34 are also shielded to minimize 60 cycle pickup. Lamp 152 serves as a gain limitation by providing increasing resistance as the load, and thus the filament temperature, increases.

While the specimen S is supported at its center which is the node for the fundamental resonant frequency, this restraint by itself is not sufficient to insure that the system will oscillate at the fundamental resonant frequency rather than at higher harmonic. However, since it is known from Equation 2 that the fundamental frequency will be about 25,000 Hz., transformer 182, an audio output transformer, acts to strongly attenuate frequencies over about 30,000 Hz. and thus all harmonics are eliminated from the system.

By reducing meter reading 206 to about 250 microamperes, the current through the drive coil is kept small enough to prevent sample heating and since resonant frequencies decrease with increasing temperatures, the apparatus is independent of temperature. A sample may be inserted in the measuring coil and an accurate frequency displayed on counter 212 within one minute. Young's modulus is thus determined at room temperature with the apparatus and specimen both at room temperature.

Since the feedback signal from coil 8 into amplifier 34 is derived from the elastic strain in the specimen rather than motion of the specimen per se, any voltages induced in coil 8 by translational movement of the specimen caused by external vibrations are very small by comparison. Thus the apparatus is relatively insensitive to external vibrations and requires a simple mounting of the specimen, merely resting on the insulating frame of coil 6.

Despite the fact that the magnetostriction of annealed low-carbon sheet steel is characteristically small and variable from specimen to specimen, and that specimens have a wide range of thickness, permeability and magnetostriction coefficients, the fundamental, longitudinal resonant frequency of a group of samples determined on our apparatus came within 18 Hz. of the resonant frequencies (about 25,000 Hz.) determined by highly accurate laboratory methods using variable frequency oscillators and capacitance displacement gauges. The fact that the laboratory results gave typically lower frequencies than our apparatus may be explained by the time required to test samples in the laboratory, which was long enough to heat the sample sufficiently to lower the resonant frequency.

We have thus provided apparatus to measure the fundamental, longitudinal, mechanical resonant frequency of a specimen of carbon sheet steel which uses the specimen as the frequency determining element with sufficient accuracy to reliably determine Young's modulus of elasticity and overcome the inherent high internal damping, low magnetostriction and variable permeability characteristics of carbon steel. Determination is made at sufficiently low power levels to preclude specimen heating and is made quickly and requires little operational skills. The apparatus is insensitive to external vibrations, specimen width and thickness, permeability and magnetostriction coefficient.

While the description of our invention was directed towards determining the fundamental, longitudinal resonant frequency of typical low-carbon steel sheet, the parameters given may obviously be altered to determine other resonant frequencies or a resonant frequency of any elongated specimen or magnetostrictive material.

We claim:

1. Apparatus for determining the resonant frequency of an elongated specimen of magnetostrictive material of predetermined length and density and having high internal damping and low magnetostriction characteristics comprising means for supporting the specimen at its center, an encircling driving coil surrounding one end of the supported specimen, an encircling pickup coil surrounding the other end of the supported specimen, means for biasing the supported specimen with sufficient magnetic bias to prevent magnetic field reversal and frequency doubling at the intended resonant frequency, means for magnetic shielding of the pickup coil from the driving coil, high gain amplifying means having an output connected to said driving coil and an input connected to said pickup coil whereby resonant frequency magnetostriction begins without first impressing a varying magnetic field on said specimen, a phase shifting network for placing the output of said amplifier means in oscillatory relationship with the input of said amplifier means, filtering means in said amplifier means for filtering out unwanted signals below and above the expected resonant frequency, means for adjusting the gain of the amplifier means, means for determining that magnetostrictive oscillations have begun in response to increasing the gain of the amplifier means, means in said amplifier means for reducing the gain of said amplifier means in response to said specimen beginning to oscillate and for maintaining the gain at a reduced level during oscillation, and means connected to the output of said amplifier means for determining the frequency of the amplifier output.

2. Apparatus according to claim 1 in which said means for shielding includes a first ferromagnetic shielding cup surrounding said drive coil, a second ferromagnetic cup surrounding said pickup coil and each of said cups having an end adjacent the means for supporting the specimen with an axial opening closely approximating the cross sectional dimensions of the specimen and sides extending beyond the end of the respective encircling coils away from said means for supporting said specimen.

3. Apparatus according to claim 1 in which said means for biasing includes a source of direct current, a coil frame, a coil wound on the outside of said frame and connected to said direct current source, and in which said means for supporting the specimen is the inside of said coil frame.

References Cited
UNITED STATES PATENTS

| | | | |
|---|---|---|---|
| 3,151,284 | 9/1964 | Kleesattel | 331—157 X |
| 2,896,446 | 7/1959 | Lewis | 324—34 MA |
| 2,000,025 | 5/1935 | McD. Ide | 331—157 |

OTHER REFERENCES

Muzzey, Jr., D. S., Some Measurements of the Longitudinal Elastic Frequencies of Cyl. Usinya Mag. Osc.; Physical Review, vol. 36, September 1930, pp. 935–947.

ROBERT J. CORCORAN, Primary Examiner

U.S. Cl. X.R.

73—672; 331—157